Feb. 5, 1957　　　B. C. BUTLER ET AL　　　2,779,956
BLANK REVERSING MEANS FOR MULTIPLE SPINDLE MACHINE
Filed May 2, 1950　　　　　　　　　　　　　　3 Sheets-Sheet 1

INVENTORS
BERTELL C. BUTLER &
ELMER BUSCH

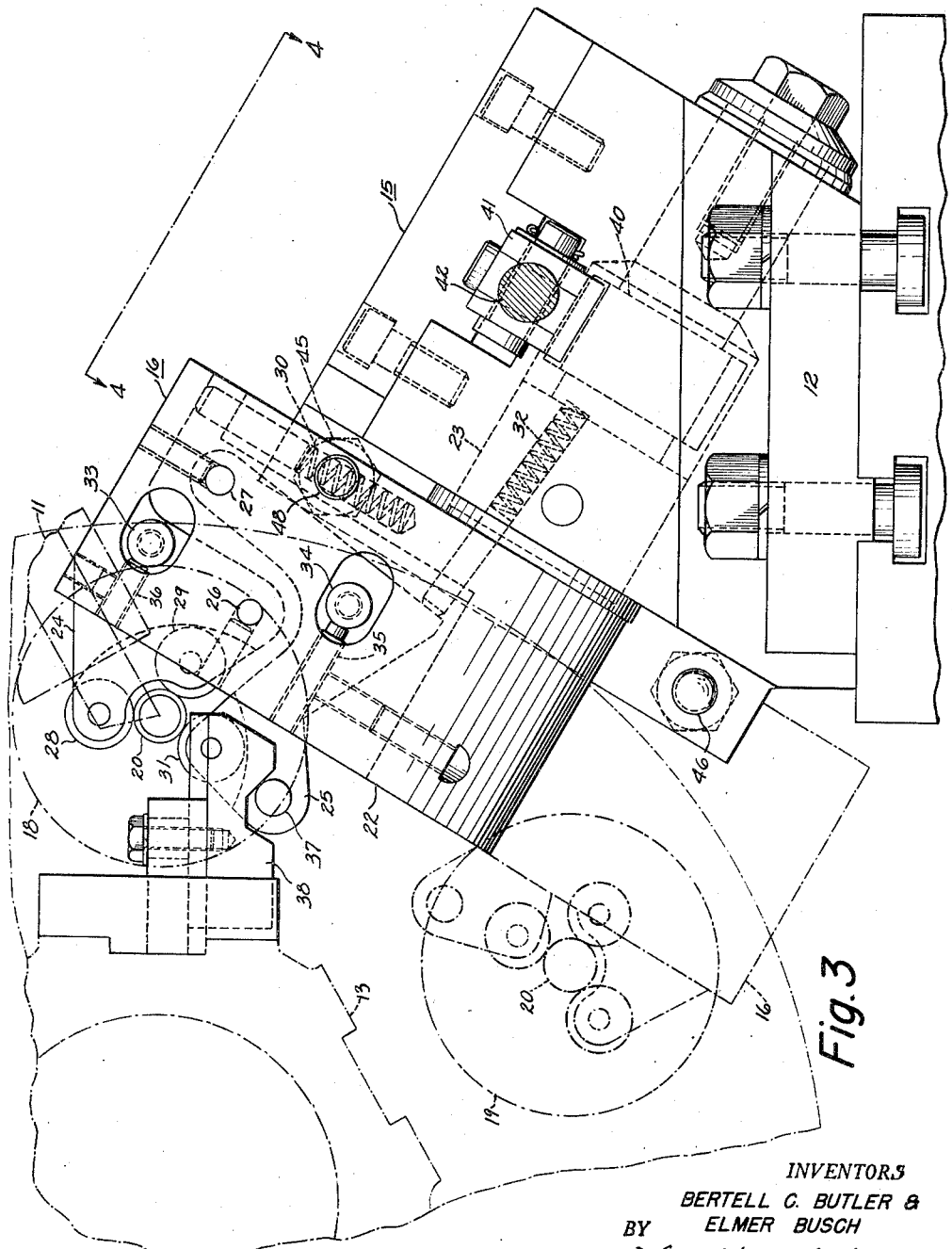

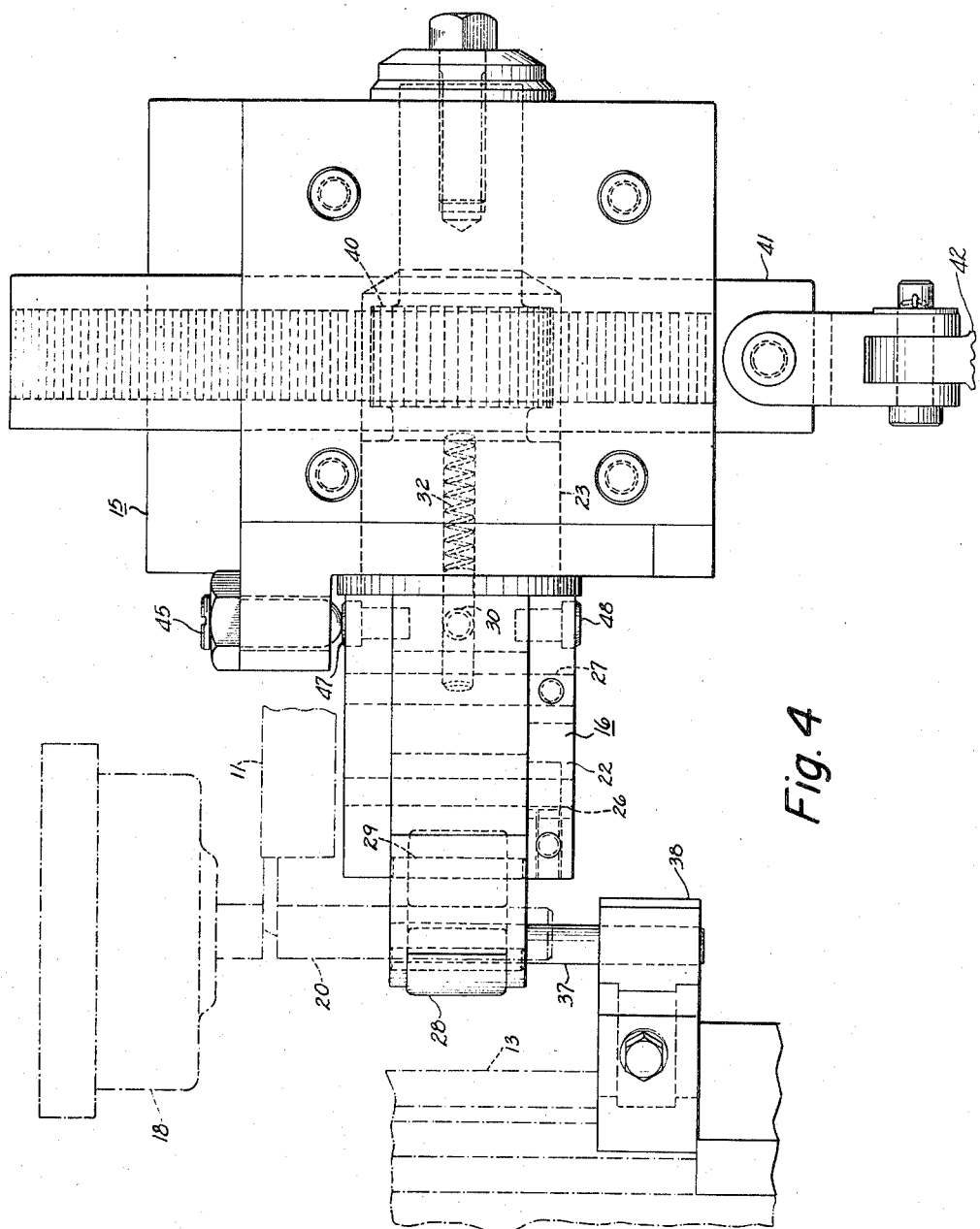

United States Patent Office 2,779,956
Patented Feb. 5, 1957

2,779,956

BLANK REVERSING MEANS FOR MULTIPLE SPINDLE MACHINE

Bertell C. Butler and Elmer Busch, Cleveland, Ohio, assignors to The National Acme Company Application May 2, 1950, Serial No. 159,506

7 Claims. (Cl. 10—166)

The present invention relates to reverse loading mechanisms for multiple spindle machines and especially to an attachment for picking up a workpiece from a first spindle of a multiple spindle machine and moving the workpiece to a second spindle thereof after turning the workpiece end for end.

In making parts on a multiple spindle machine from bar stock or forgings, where several operations such as turning, forming, drilling, tapping, threading, are to be performed on one end of the piece; and then the piece has to be cut off, picked up, and other operations performed on the cutoff end of the piece; it is desirable to pick up the piece, turn the piece around, and rechuck the piece for the additional operations. To accomplish this we have been able to succeed in designing and making a device which will do just that.

The invention consists of a simple attachment, positively operated, to swing from one position to another on the spindle index, which picks up the piece, then turns the piece around to be rechucked and other operations performed on the cutoff end. While pickup attachments are well known in the trade to hold the piece during the cutoff operation, to eliminate cutoff burrs, or to perform a light, simple burring or chamfering operation on the part, this operation was confined just to one tool; but with this attachment as described above we are able to drill, tap, thread, or form the piece on two or more spindles, which heretofore was never known to the trade. To perform the same operations we had to cut off the part and transfer it by means of a chute, magazine, or hopper feed to another machine which was specially tooled up for second operation. With this attachment we can eliminate the use of two machines and perform the same operation on one machine.

The attachment specifically described herein by way of example has been designed for use with a six spindle automatic machine, such as the machine illustrated and described in the Patent No. 2,033,490 to C. W. Simpson et al. issued March 10, 1936. It is understood that the present illustration and description is made by way of example and is not intended to limit the use of the herein disclosed invention to the specific structure and the specific machine identified. The invention may be applied to other machines and to other similar operations wherein a workpiece is to be picked up from a first workpiece holder, turned end for end and reloaded either in that workpiece holder or in a second workpiece holder.

One of the objects of the invention is to provide an attachment which will pick up a workpiece from a holder, turn the workpiece end for end, and reload it in a workpiece holder.

Another object is to provide an inexpensive attachment for a multiple spindle machine which will pick up a workpiece from a first spindle of the machine and reload the workpiece in a second spindle of the machine after turning the workpiece end for end.

Other objects and a fuller understanding of this invention may be had by referring to the following description and claims, taken in conjunction with the accompanying drawings, in which:

Figure 3 is an elevational view showing the construction of the pickup and the inverter connection; and Figure 4 is a top view of the structure illustrated in Figure 3.

Figure 1:
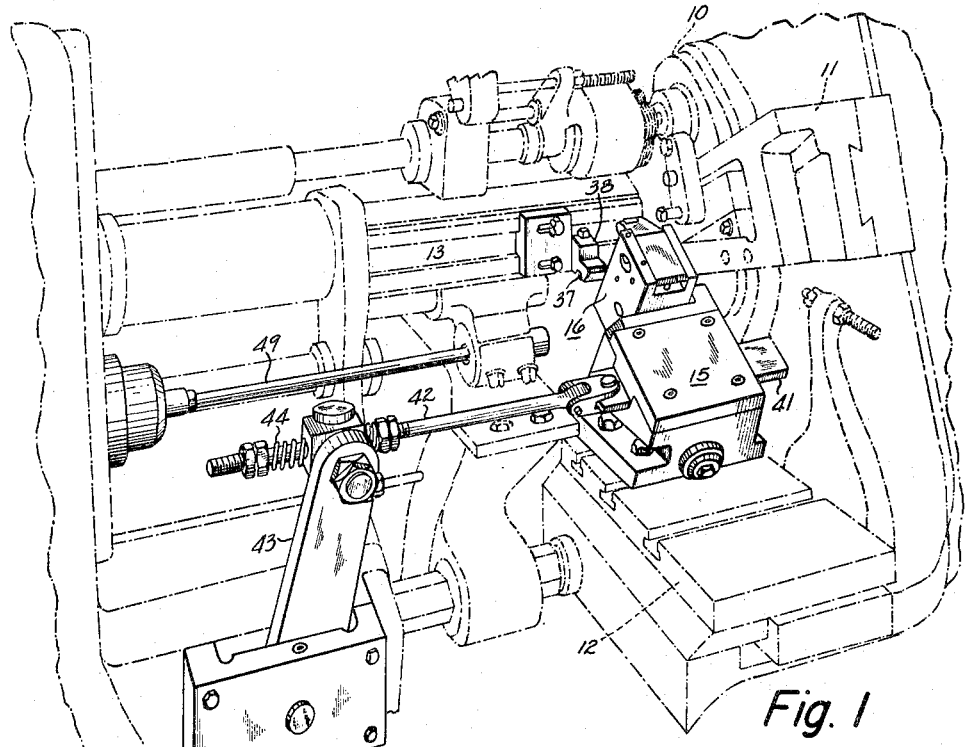
Figure 1 is a fragmentary picture view of a multiple spindle machine having the reverse loading mechanism attachment thereon with the pick up in position for picking up a workpiece from a first spindle of the machine.
Figure 2:
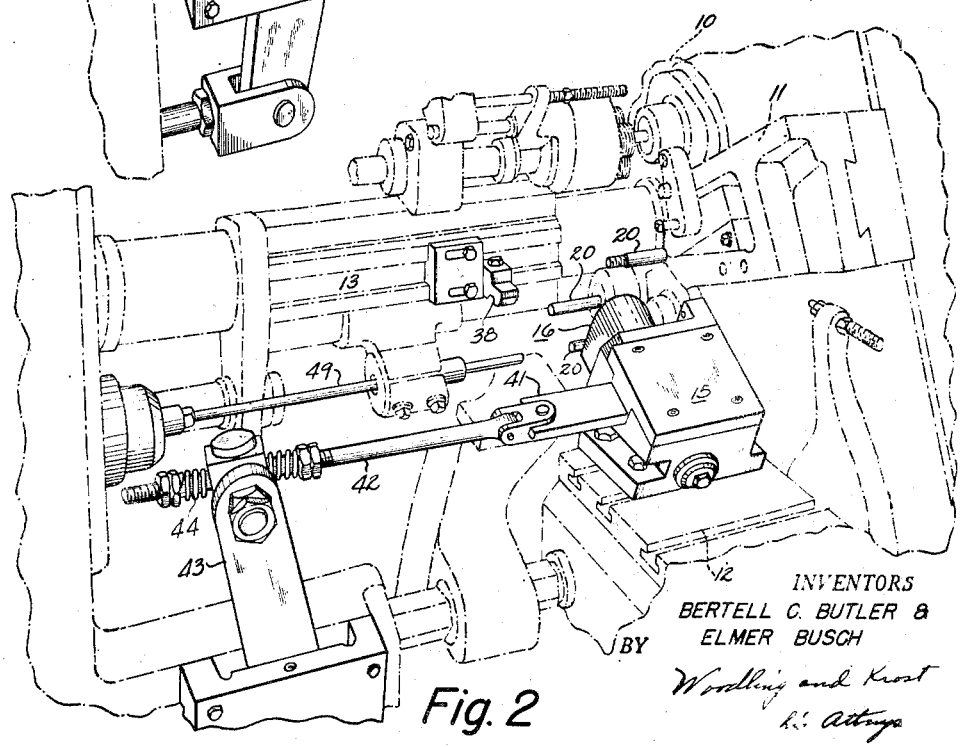
Figure 2 is the same picture view as in Figure 1, but showing the workpiece pick up in position for reloading the workpiece in another spindle after turning the workpiece end for end.

The attachment for picking up a workpiece from a first spindle and depositing the same at a second spindle after turning the workpiece end for end is illustrated in Figures 1 and 2 as being fastened to a six spindle multiple spindle machine. The machine illustrated in the figures is the Simpson et al. machine identified previously in this application. The machine has a spindle index 10 carrying a plurality of spindles including what are termed herein as the first and second spindles. In this particular instance, the first spindle is in the fifth position in the cycle of machines and the second spindle is in the sixth position in the cycle of the machine. In this particular operation, the spindle index 10 is indexed two spaces each time it is indexed. Thus, the bar stock would proceed from the first position to the third position and then to the fifth position. In this fifth position, the small workpiece is cut from the bar stock after the workpiece has been machined or otherwise tooled on one end thereof. While the small workpiece is being cut from the long bar of stock, the pickup attachment grips the workpiece. As soon as the workpiece has been cut off, the pickup attachment moves the workpiece from the spindle which is in the fifth position to the spindle which is in the sixth position, as well as turning the workpiece end for end. The workpiece then is indexed from the sixth position to the second position, the fourth position and back to the sixth position where it is ejected from the machine as a completed article. Thus, while the workpiece is a part of the bar supported by the spindle, one end of the workpiece is tooled in the first, third and fifth positions of the spindles. Then the workpiece is reloaded in the empty spindle positioned in the sixth position so that the other end thereof may be tooled in the second and fourth positions. In this way, it is possible to keep the tooling or machine operations on both ends of the workpiece entirely automatic and without handling the workpiece at any time.

The machine on which this particular attachment has been mounted also has a fifth position cutoff tool holder 11 for supporting a cutoff tool, also carrying the reference character 11 herein. The pickup and turn over attachment is mounted on the lower side slide 12 of the machine so that it is shiftably mounted on the machine for shiftable movement toward and away from the spindles located in the fifth and sixth positions of the spindle index 10. The standard end tool slide 13 is also indicated in the drawings as a part of the machine. It is noted that in Figures 1 and 2, much of the machine has been illustrated in phantom since the machine proper is fully described in the herein cited patent to Simpson.

The attachment for picking up a workpiece from a first spindle and reloading the workpiece in the second spindle is best illustrated in Figures 3 and 4. This attachment comprises a holder 15 shiftably mountable on the machine for shiftable movement toward and away from the spindles. As is indicated in Figure 1, the holder 15 is preferably carried by the lower side slide 12. A pickup 16 is movable on this holder 15 to pick up a workpiece carried by said first spindle. In Figure 1, the pickup 16 is illustrated in alignment with the first spindle or that spindle in the fifth position on a machine and in Figure 2, the pickup 16 is shown in alignment with the second spindle or that spindle in the sixth position on the machine. The pickup is preferably pivotally mounted on the holder 15 so that it may be inverted from the position of Figure 1 to the position of Figure 2 and thereby turn the workpiece carried thereby end for end.

The spindle carried by the spindle index 10 which is in the fifth position carries reference character 18 and the spindle in the sixth position carries reference character 19 in the drawings. The movement of the pick up 16 in carrying a workpiece of the fifth position spindle 18 to the sixth position spindle 19 is illustrated in Figures 1, 2 and 3. In Figure 3, the position of the pick up 16 for loading the workpiece in the sixth position spindle 19 is illustrated in phantom. The workpiece being transferred from the fifth position spindle 18 to the sixth position spindle 19 and being turned end for end carries reference numeral 20. In actual practice, the pickup 16 lightly grips the workpiece 20 before the workpiece is cut from the bar stock by the tool 11.

The pickup 16 is constructed from a roller block holder or support member 22 having a shank 23 thereon. This shank 23 is extended transverse to the axis of the indexing spindle 10 and thus to the workpiece supporting spindles 18 and 19. The holder 15 has a shank receiving opening receiving this shank 23 for pivotally supporting the pickup head 16 so that the pickup head may be pivotally inverted from the fifth position spindle 18 to the sixth position spindle 19 as indicated in Figures 1 to 3. The roller block holder or support member 22 resiliently supports roller blocks 24 and 25 by means of their respective pivots 26 and 27. On the roller block 24 are two workpiece engaging rollers 28 and 29 which are spaced apart to contact a workpiece, such as the workpiece 20 at annularly spaced points about the workpiece. The roller 28 is positioned at a distance from the pivot 26 while the roller 29 is positioned generally between the pivot 26 and the axis of the workpiece 20. Thus, pivotal movement of the roller block 24 in the support member 22 pivots the roller 28 further from the axis of the workpiece 20 than the roller 29 is pivoted. A resilient member, such as coil spring 30, supported within the support member 22 and abutted against the roller block 24, urges the roller block 24 pivotally about the pivot 26 to urge the rollers 28 and 29 against a workpiece 20.

Similarly, the roller block 25 is provided with a roller 31 positioned to engage the workpiece 20 at an annular distance from the rollers 28 and 29 carried by the roller block 24. A resilient member, such as spring 32 in the shank 23 and the support member 22 of the pickup head 16, abuts against the roller block 25 to urge the roller 31 towards the center of the workpiece and thus generally towards the rollers 28 and 29.

Many times, a very thin wall or delicate workpiece would be constructed in the machine. Since the workpiece 20 is cut off after it is gripped by the rollers 28, 29 and 31, the roller blocks 24 and 25 have been provided with stop bolts 33 and 34, respectively. These stop bolts, along with their set screws 36 and 35, respectively, which set screws are threaded into the support member 22, limit the movement of the roller blocks by their springs and thus control the initial position of and the minimum distance between the rollers 28, 29 and 31 when no workpiece is gripped therebetween. In this manner, the pressure with which a workpiece 20 is initially gripped by the rollers may be regulated. To further insure that there will be no damage done to the workpiece, the roller block 25 is provided with a cam pin 37 and the end tool slide 13 of the machine with a cam 38. As the pickup is moved transversely of the axis of the workpiece 20 on the slide 12 to cause the rollers to grip the workpiece 20, this pin 37 engages the cam 38. The cam 38 and the pin 37 cooperatively move the roller block 25 against the resilient urging of the spring 32 to move the roller 31 away from engagement with the workpiece 20. After the rollers 28 and 29 have contacted the workpiece 20, the cam 38 allows the roller 31 to contact the workpiece 20. In this manner the workpiece is supported by the rollers 28, 29 and 31 without any of the rollers exerting excessive pressure on the workpiece.

As was previously mentioned, the pickup 16 is pivotally supported by the pickup holder 15 which is mounted on the lower side slide 12. The shank 23 which pivotally supports the support member 22 on the holder 15 is provided with a gear 40. Movement of this gear 40 by a rack 41 which is in toothed engagement therewith, as best illustrated in Figures 3 and 4 of the drawings, pivotally inverts the pickup 16 and the workpiece 20 carried thereby from the position of Figure 1 to the position of Figure 2 or from the fifth position spindle 18 to the sixth position spindle 19, as illustrated in Figure 3. The rack 41 is slidably mounted in the pickup holder 15 for slidable movement transversely of the shank 23 or for slidable movement substantially parallel to the axis of the spindles 18 and 19. The gear rack 41 is controlled by an independent cam movement to push the gear rack in forward or backward position positively controlled through cams and cam shafts which controls the cycle of the automatic machine. When the gear rack 41 is pushed backwards or away from the spindle carrier from the position of Figure 1 to the position of Figure 2, the attachment or pickup 16 turns from the fifth position spindle to the sixth position spindle.

The rack 41 is moved back and forth by the connecting rod 42 and rocker arm 43 illustrated in Figures 1 and 2. The connecting rod 42 is resiliently connected to the rocker arm 43 by springs 44 to permit a slight degree of resiliency between the inverting movement of the pickup 16 and the cam which controls that movement. The rocker arm 43 and its operation by cams within the machine is well known to those acquainted with these machines, since this rocker arm has been previously used for other attachments on the machine. The spring 44 allows for proper alignment of the rollers 28, 29 and 31 with a workpiece 20 in both the fifth and sixth position spindles 18 and 19. The rollers 28, 29 and 31 should be aligned parallel to the axis of the spindles to prevent undue twisting or turning of the workpiece while it is being cut from the fifth position spindle and while it is being loaded in the sixth position spindle. Adjustable stop bolts 45 and 46 carried by the holder 15 insure proper alignment of the pickup 16 with the spindles 18 and 19, respectively. The support member 22 has a button 47 which abuts the stop bolt 44 when the pickup 16 is pivoted to the fifth position spindle 18 as shown in Figures 1, 3 and 4. On the other side of the pickup 16 is another button 48 abuttable against the stop bolt 46 when the pickup has been pivotally inverted to alignment with the sixth position spindle 19. These stop bolts 45 and 46 cooperate with the spring 44 between the connecting rod 42 and rocker arm 43 to permit very fine adjustment of the movement of the pickup 16 by the suitable cams within the machine.

In operation, the lower side slide 12 moves the pickup attachment inwardly for the rollers 28 and 29 and 31 to grip the workpiece 20 in the fifth position spindle 18. After the workpiece 20 has been gripped, it is cut off by the cutting tool 11. Next the pickup is pivotally inverted about the shank 23 by means of the rack 41 and gear 40 to pivotally move the workpiece 20 to the sixth position spindle as indicated in phantom in Figure 3 and in solid in Figure 2. This pivotal inverting of the workpiece 20 also turns the workpiece end for end and aligns it for insertion into the sixth position spindle. Although mechanical and other suitable devices may be used, the present machine is provided with an air-operated plunger 49 to load the workpiece into the sixth position spindle. This plunger or loader 49 is axially aligned with the sixth position spindle 19 and pushes the workpiece 20 endwise from between the rollers 28, 29 and 31 into the spindle collet 19 whereupon the workpiece 20 is chucked in the collet of the spindle located in the sixth position.

As soon as the workpiece has been chucked in the sixth position spindle, the loader 49 moves away from the spindle and the lower side slide 12 moves the reverse loading attachment outwardly away from the spindle. The cams also operate through the rocker arm 43 to position the pickup 16 as shown in Figure 1 in readiness for gripping a workpiece coming into the sixth position of the spindle. After all of these parts of the attachment including the pickup 16 and the loader 49 have been moved out of the way, the indexing spindle 10 is indexed to the next tooling position as controlled by the cams within the machine.

The present attachment has been described as being used in connection with the six spindle automatic machine since the attachment has actually been installed on such machine. The machine on which this attachment was actually used constructed a stud threaded on both ends. The stud was threaded on one end with a die head, gripped by the rollers in the pickup, cut off by the tool 11, turned around for insertion in the next spindle, and threaded on the other end with a die head. Although this operation performed was simple and the machine was set up to thread both ends of a stud, it is understood that any forming, drilling, tapping or any other operation required can be performed on both ends of a workpiece with this particular attachment. This reverse loading mechanism is a very simple design and can be adapted for any size of machine. It is positively operated by the cam controls of the machine and is inexpensive. As has previously been pointed out, the loading mechanism or attachment described and claimed herein can be easily changed for different diameters of workpieces by adjusting or replacing the roller holders 24 and 25.

The whole pickup holder 15, including the pickup 16, may be adjusted for different lengths of workpieces 20 by moving the holder 15 sidewise on the forming slide 12, thus moving the holder closely to or further from the spindle index 10. It is also understood that this attachment may be used on the machines of either four, eight, or other spindle styles without departing from the spirit and scope of the invention.

This attachment is very simple in construction and eliminates expensive equipment and tooling, which before had to be done on two separate machines to work on both ends of a workpiece, without handling the workpiece.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In an attachment for gripping a workpiece before it is cut from the bar stock in a spindle at a first position of a multiple spindle machine and reloading the workpiece after the workpiece is cut from the bar stock in a spindle at a second position thereof after turning the workpiece end for end, the provision of, a holder slidably mountable on said machine for movement in a plane substantially perpendicular to the axes of said spindles and in a path other than parallel to a plane containing the axes of said spindles, said holder having a shank receiving opening therein, a support member having a shank extending in said opening, roller blocks pivoted on said support member on pivot axes parallel to said spindle axes and supporting a plurality of rollers in spaced relation to grip a workpiece before it is cut from the bar stock, springs urging said rollers toward each other, a reciprocable inverting member drivingly connectable with said shank to invertingly pivot said support member in a plane substantially parallel to the plane containing the axes of said spindles from said first spindle position to said second spindle position after a workpiece is cut from the bar stock and also turn said workpiece carried thereby end for end, a cam on said machine adjacent said first spindle position, and a cam follower on one of said roller blocks engageable by said cam upon sliding movement of said holder toward said first spindle position to first separate the rollers on said roller blocks and subsequently permit said springs to urge said rollers toward each other to grip a workpiece in said first spindle position.

2. In an attachment for gripping a workpiece before it is cut from the bar stock in a spindle at a first position of a multiple spindle machine and reloading the workpiece after the workpiece is cut from the bar stock in a spindle at a second position thereof after turning the workpiece end for end, the provision of, a holder slidably mountable on said machine for movement in a plane substantially perpendicular to the axes of said spindles and in a path other than parallel to a plane containing the axes of said spindles, said holder having a shank receiving opening therein, a support member having a shank extending in said opening, roller blocks pivoted on said support member on pivot axes parallel to said spindle axes and supporting a plurality of rollers in spaced relation to grip a workpiece before it is cut from the bar stock, springs urging said rollers toward each other, a reciprocable inverting member drivingly connectable with said shank to invertingly pivot said support member in a plane substantially parallel to the plane containing the axes of said spindles from said first spindle position to said second spindle position after a workpiece is cut from the bar stock and also turn said workpiece carried thereby end for end, stops on said holder and engageable by said support member to limit the movement of the support member relative to the holder and thereby align the rollers with the spindles, a loader shiftably mountable on said machine to move the workpiece from said rollers into the spindle at said second spindle position after the workpiece has been turned end for end and moved to said second spindle position, a cam on said machine adjacent said first spindle position, and a cam follower on one of said roller blocks engageable by said cam upon sliding movement of said holder toward said first spindle position to first separate the rollers on said roller blocks and subsequently permit said springs to urge said rollers toward each other to grip a workpiece in said first spindle position.

3. In a multiple spindle machine the provision of, a holder slidably mountable on said machine for movement in a plane substantially perpendicular to the axes of said spindles and in a path other than parallel to a plane containing the axes of said spindles, said holder having a shank receiving opening therein, a support member having a shank extending in said opening, roller blocks pivoted on said support member on pivot axes parallel to said spindle axes and supporting a plurality of gripping rollers in spaced relation to grip a workpiece carried in a spindle, springs urging said rollers toward each other, a first cam on said machine adjacent a first spindle position, a first cam follower on one of said roller blocks engageable by said first cam upon sliding movement of said holder toward said first spindle position to first separate the rollers on said roller blocks and subsequently permit said springs to urge said rollers toward each other to grip a workpiece in said first spindle position, a reciprocable inverting member drivingly connectable with said shank to invertingly pivot said support member in a plane substantially parallel to said spindle axes and transverse to the sliding movement of said holder from said first spindle position to a second spindle position and also turn said workpiece carried thereby end for end, stops on said holder and engageable by said support member to limit the movement of the support member relative to the holder and thereby establish said rollers parallel with said spindle axes, a loader shiftably mountable on said machine to move the workpiece from said rollers into the spindle at said second spindle position after the workpiece has been turned end for end and moved to said second spindle position, first means to first slide said holder in a first direction to operate said first cam and follower, second means to subsequently operate said inverting member without operating said first cam and follower, and said first means subsequently sliding said holder in the return direction without operating said first cam and follower.

4. In a multiple spindle machine having first cam means and first and second spindle positions, the provision of, a holder movable toward said first spindle position along a first path other than parallel to a first plane containing the axes of said first and second spindle positions, gripping means carried on said holder and movable to grip a workpiece in one of said spindle positions, second cam and follower means located along said first path to operate said movable gripping means to grip a workpiece upon movement of said holder toward said first spindle position, and third cam follower means drivingly operable from said first cam means and connectable with said movable gripping means to tumble said gripping means and said workpiece carried thereby end for end to present the other end of the workpiece in alignment with the second spindle position, said tumbling movement being in a second path in a second plane substantially parallel to said first plane and spaced from said second cam and follower means whereby said second cam and follower are inoperative during movement of said gripping means in said second path.

5. In a multiple spindle machine having first cam means and first and second spindle positions, the provision of, a holder movable toward said first spindle position along a first path other than parallel to a first plane containing the axes of said first and second spindle positions, gripping means carried on said holder and movable to grip a workpiece in one of said spindle positions, second cam and follower means located along said first path to operate said movable gripping means to grip a workpiece upon movement of said holder and said gripping means thereon toward alignment with said first spindle position, third cam follower means drivingly operable from said first cam means and connectable with said movable gripping means to tumble said gripping means and said workpiece carried thereby end for end in a second path in a second plane substantially parallel to said first plane, said first cam means operable to first move said holder along said first path and then subsequent to said tumbling action cause retraction of said holder along a third path in a direction opposite to said movement along said first path, and said second cam and follower being located out of said second and third paths and hence inoperative during movement of said gripping means in said second and third paths.

6. In a multiple spindle machine having first cam means and first and second spindle positions, the provision of, a holder movable by said first cam means toward said first spindle position along a first path other than parallel to a first plane containing the axes of said first and second spindle positions, gripping means carried on said holder and movable to grip a workpiece in one of said spindle positions, second cam and follower means located along said first path to operate said movable gripping means to grip a workpiece upon movement of said holder and said gripping means thereon toward alignment with said first spindle position, third cam follower means drivingly operable from said first cam means and connectable with said movable gripping means to tumble said gripping means and said workpiece carried thereby end for end in a second path in a second plane substantially parallel to said first plane, said first cam means operable to first move said holder along said first path and then subsequent to said tumbling action cause retraction of said holder along a third path in a direction opposite to said movement along said first path, said second cam and follower being located out of said second and third paths and hence inoperative during movement of said gripping means in said second and third paths, and said third cam follower being operable by said first cam subsequent to movement of said holder along said third path to tumble said movable gripping means in the opposite direction along a path parallel to said second path and excluding said second cam and follower.

7. In a multiple spindle machine having first and second spindle positions, the provision of, a holder mountable on said machine for movement along a first path other than parallel to a first plane containing the axes of said first and second spindle positions, a support member pivotable on said holder on an axis substantially perpendicular to said first plane, gripping means pivoted on said support member to be operable upon pivotal movement thereof to grip a workpiece carried in a spindle, a reciprocable inverting member drivingly connectable with said support member to tumble said gripping means and a workpiece carried thereby end for end in a second path relative to said holder in a second plane substantially parallel to said first plane, and cam means firstly to move said holder in a first direction on said first path to advance said gripping means and operate same on the pivots thereof to grip a workpiece, secondly to tumble said support member and gripping means in a first direction on said second path, thirdly to move said holder in the opposite direction on said first path to retract said gripping means, and lastly to tumble said support member and gripping means in the opposite direction on said second path, said first and third movements of said gripping means having different locations relative to said first path of said holder to preclude operation of said gripping means during said second, third, and last movements of said gripping means.

References Cited in the file of this patent
UNITED STATES PATENTS

| | | |
|---|---|---|
| 391,533 | Howard | Oct. 23, 1888 |
| 508,864 | Briggs | Nov. 14, 1893 |
| 1,063,593 | Raiche | June 3, 1913 |
| 1,648,900 | Heard | Nov. 15, 1927 |
| 1,904,493 | Mathias | Apr. 18, 1933 |
| 2,038,541 | Clouse | Apr. 28, 1936 |
| 2,100,028 | Frayer | Nov. 23, 1937 |
| 2,128,186 | Jones | Aug. 23, 1938 |